United States Patent
Waugh et al.

(10) Patent No.: US 6,473,898 B1
(45) Date of Patent: Oct. 29, 2002

(54) METHOD FOR COMPILING AND SELECTING DATA ATTRIBUTES

(75) Inventors: Lawrence T. Waugh, Austin, TX (US); Steven M. List, Austin, TX (US)

(73) Assignee: pcOrder.com, Inc., Austin, TX (US)

( * ) Notice: Subject to any disclaimer, the term of this patent is extended or adjusted under 35 U.S.C. 154(b) by 0 days.

(21) Appl. No.: 09/350,270

(22) Filed: Jul. 6, 1999

(51) Int. Cl.[7] .................................................. G06F 9/44
(52) U.S. Cl. .................................... 717/168; 707/104.1
(58) Field of Search ............................ 717/1, 100–123, 717/168–178; 707/101, 102, 103 R, 104.1, 200, 203, 204, 3, 103, 103 Y, 103 Z; 709/220; 710/8, 15; 711/1, 170

(56) References Cited

U.S. PATENT DOCUMENTS

| | | | | |
|---|---|---|---|---|
| 5,842,223 A | * | 11/1998 | Bristor | 707/204 |
| 6,052,681 A | * | 4/2000 | Harvey | 707/3 |
| 6,119,125 A | * | 9/2000 | Gloudeman et al. | 707/103 R |
| 6,145,120 A | * | 11/2000 | Highland | 717/106 |
| 6,314,460 B1 | * | 11/2001 | Knight et al. | 709/220 |

* cited by examiner

Primary Examiner—Gregory Morse
Assistant Examiner—Hoang-Vu Antony Nguyen-Ba (57) ABSTRACT

A system and method for compiling data defining objects such as, but not necessarily limited to, components to be configured into a personal computer system. With respect to such components, a predetermined array of attributes is established to characterize particular components. At least two operators, or agents, independently acquire, from a global source of relevant data, values for the attributes. In a preferred embodiment, the agents are provided with a finite set of predetermined values, or ranges of values, that is deemed to include a value that is accurate for the attribute under consideration. The agents then respectively select values for the attribute, with the selection based on the acquired values considered with respect to the predetermined values. The respective values are error checked and then compared for equality. If the values selected by the agents are equal, a value for the attribute is written into an attribute database. If the values are not equal, the discrepancy is resolved empirically. A compilation of data defining the component is then extracted from the attribute database. In order to enhance accuracy, the global source of relevant data is regularly analyzed to, for example, identify updated attribute values.

37 Claims, 7 Drawing Sheets

| Attribute | Value |
|---|---|
| ⊢Installed Video Memory (MB)......................... | 2.5 |
| ⊢Native Display Resolution............................. | 1024 x 768 (XGA) |
| ⊢Color Depth at Maximum Resolution................ | |
| Pointing Device | |
| ⊢Pointing Device - Laptop............................. | 1 items selected |
| Modem | |
| ⊢Modem Data Speed (Kcps)........................... | 56 |
| PCMCIA Slots | |
| ⊢Slot Quality - DO NOT USE......................... | Not Specified |
| ⊢Slot Support - DO NOT USE........................ | Not Specified |
| ⊢Slots - Portable...................................... | 1 items selected |
| Battery | |
| ⊢Lap - Battery Type Installed........................ | Lithium Ion |
| ⊢Estimated Battery Life (Hr)......................... | 3.3 |
| Operating System | |
| ⊢Operating Systems Included....................... | 1 items selected |
| Connectivity | |
| ⊢Connector Type - Laptop........................... | 11 items selected |
| Additional Features | |
| ⊢Laptop - Included Components................... | 7 items selected |
| Dimensions | |
| ⊢Height (in)........................................... | 1.1 |
| ⊢Width (in)........................................... | 11.8 |
| ⊢Depth (in)........................................... | 9.4 |
| ⊢Weight (lb).......................................... | 4 |
| ⊢Height (cm)......................................... | 2.79 |
| ⊢Width (cm).......................................... | 30 |
| ⊢Depth (cm).......................................... | 24 |
| ⊢Weight (kg)......................................... | 1.81 |
| Certifications | |
| ⊢DMI Compliant...................................... | DMI 2.0 |
| ⊢Year 2000 Compliant............................... | Not Specified |
| Technical Support | |
| ⊢Technical Support Phone Number................. | 800-772-2227 |
| ⊢Technical Support URL............................. | http://www.ibm.com/support/wwsup30e.nsf |
| Options (Silver) | |
| W Add | |
| ⊢ Remove | |
| ⊢Additional Warranty Information................... | One year On Battery |
| ⊢Length of Warranty.................................. | 3 |
| ⊢Length of Warranty - Unit of Measu.............. | Year |
| ⊢Warranty Type....................................... | Base |
| Warranty 2 | |
| ⊢Quantity.............................................. | 1 |
| ⊢Additional Warranty Information................... | |
| ⊢Length of Warranty.................................. | |
| ⊢Length of Warranty - Unit of Measu.............. | |
| ⊢Warranty Type....................................... | |

Vendor: IBM IBM

Sku: 2641AU

Description: ThinkPad 570 PII 333 64MB 4.0GB 13.3in TFT

Mfg. Desc. IBM ThinkPad 570

URL: http://www.direct.ibm.com/cgi-bin/ncommerce/SalesNav?family=ThinkPad+570ci

Class: Laptop

Category: Pentium II 333

Change Sku Info

Save Without Closing          Save

FIG. 3

METHOD FOR COMPILING AND SELECTING DATA ATTRIBUTES

BACKGROUND OF THE INVENTION

1. Field of the Invention

The subject invention relates generally to the collection and verification of information or data and, more particularly, to a method and implementing system for the collection, verification and compilation of data that characterizes electronic equipment, including, but not limited to, a personal computer system or components thereof.

2. Description of the Related Art

It is often the case that sophisticated purchasers of electronic systems, which systems may include, but are clearly not limited to, personal computer systems, prefer to acquire customized configurations of those systems in order to accommodate the purchasers' specific desires or requirements. With respect to customized personal computer system configurations, a large number of constituent components must be selected. System components include the system processor, memory, monitor, keyboard, mouse/trackball, disk drives, printers, internal or external modems, audio subsystems, and other peripheral devices, now existing or devised hereafter. Each of the aforementioned types of components may be acquired from a number of manufacturers who typically offer various models of such components. When confronted with the vast array of potential permutations and combinations of system components, the purchaser, or system designer, will inevitably be confounded by the complexity of the selections that must be made. This situation has been somewhat ameliorated by the relatively recent availability of software that automates the system configuration and design process.

Regardless, however, whether system configuration is done empirically by a human being, or with the assistance of configuration software, the likelihood of realizing desired system performance, and achieving compatibility among system components, is largely predicated on the availability of data that adequately and accurately characterizes the system components of the system.

It might be expected that the primary source of data characterizing personal computer components would be the manufacturers themselves. Although this is generally true, it has been found that manufacturers' published information is sometimes disappointing in its accuracy, comprehensiveness, and timeliness. Furthermore, it has been found that manufacturers tend to be idiosyncratic in their approaches to providing physical or performance data to characterize their products, resulting in data sheets that may be underinclusive in failing to provide data necessary to the configuration of a system or overinclusive in providing data that is irrelevant to system configuration.

Accordingly, what is desired is a solution that enables the collection, verification and compilation of data that facilitates the customized configuration of personal computer systems in a manner that realizes desired system performance and avoids incompatibilities among system components.

SUMMARY OF THE INVENTION

The above and other objects, advantages and capabilities are achieved in one aspect of the subject invention by a method for compiling data to specify an object, which object may include, but is clearly not confined to, a component to be included in a personal computer system. The method contemplates establishing a predefined array of attributes that characterize the object. A plurality of agents, acting independently, acquire respective values of the each predefined object attributes from a global source of such values. The values acquired by the agents are checked against values, or ranges of values, that have been predetermined to be accurate. The attribute values respectively acquired by the agents are then compared for situational equivalence. If the values are found to be situationally equivalent, they are written into, or retained in, a database. If not, a resolution process is invoked that results in retention in the database of a presumptively accurate value. As an enhancement, the global source of data is routinely examined to determine whether attribute values have been updated.

Another aspect of the invention inheres in a combined hardware/software system that enables the compilation of data in congruence with the inventive method summarized above. The system comprises acquisition means for acquiring values of attributes that have been preselected to characterize the object. The acquired values are applied to a difference means that determines the situational equivalence, or lack thereof, of at least two independently acquired values of the same attribute. A database coupled to the difference means retains attribute values that have been determined to be accurate.

A further aspect of the invention resides in a method of compiling data to specify an object, the method comprising, via a first agent, (i) accessing a global source of information that contains values characterizing attributes of the object, (ii) comparing the values accessed to a predetermined value, or range, that has been determined to be accurate, (iii) selecting a value of the attribute, and (iv) writing the value selected into a database. The operations indicated above are performed, independently and in tandem, via a second agent. Subsequently, a difference engine retrieves from the database values written for a particular attribute and determines whether the values are equivalent. If so, a value for the asset is retained in the database. If not, a resolution process is invoked, according to which a value may be empirically determined and written to the database.

Yet another aspect of the invention is represented in a data compiler for a system that utilizes a number of acquisition agents for independently acquiring values of one or more attributes that characterize an object. The data compiler comprises a database and a difference engine. The database has one or more inputs for coupling to the agents to select attributes with reference to predetermined permissible values of the attributes. The difference engine is coupled to the database for (i) reading two or more values of the attribute that have been selected by agents and are stored in the database, (ii) comparing the two or more values, and (iii) if the values that are compared are equivalent, causing a value to be retained by the database, and(iv) if the values that are compared are not equivalent, causing a resolution process to be invoked.

Another aspect of the invention is realized by a data collection and compilation system for creating, storing, and distributing a record that characterizes an object, the record containing values of a predetermined array of attributes that characterize the object. The system comprises a first database for storing the record and a processor coupling a first research analyst to a global source of information containing candidate values of the attributes and coupling the first research analyst to the database for entering into the record values selected by the first research analyst, as well as a processor coupling a second research analyst to a global source of information containing candidate values of the attributes and coupling the second research analyst to the database for entering into the record values selected by the second research analyst.

A difference engine is coupled to the first database for (i) reading and comparing the respective values entered by the first and the second research analysts, (ii) for comparing those values, and (iii) for causing to be inserted into the record status information that indicates whether the values compared are equivalent or not equivalent. A processor is included for coupling a reconciliation agent to the first database for enabling the agent to read a record that contains status information that indicates that values compared by the difference engine were not equivalent and-for enabling the reconciliation agent to enter a reconciled value for the attribute.

An aspect of the invention is also realized in a system that utilizes a plurality of acquisition agents for respectively and independently acquiring values of an attribute for characterizing an object, wherein each of the agents acquires a value by searching a source of information regarding the object and, as a result of the search, selects and enters into a database a value of the attribute. This aspect includes a difference engine coupled to the database for (i) reading two or more values of the attributes that have been selected by agents and are stored in the database, (ii) comparing the two or more values, and (iii) if the values that are compared are determined by the difference engine to be equivalent, causing a value to be retained by the database, and (iv) if the values that are compared are determined by the difference engine not to be equivalent, causing a reconciliation process to be invoked.

A specific aspect of the invention is practiced in a method of compiling data to specify an object. The method comprises the steps: (a) establishing a predetermined array of attributes to characterize the object, which array includes at least one attribute that is constituted from an undefined number of subattributes of the same type; (b)(i) by virtue of a first acquisition agent, determining the undefined number of subattributes and acquiring a first set of values for the number of subattributes determined by the first acquisition agent; and (b)(ii) by virtue of a second acquisition agent, and substantially independent of the first acquisition agent, determining the undefined number of subattributes and acquiring a second set of values for the number of subattributes determined by the second acquisition agent, wherein the undefined number of subattributes is respectively, and independently, determined by the first and by the second acquisition agents upon acquisition of the values.

BRIEF DESCRIPTION OF THE DRAWINGS

The present invention may be better understood, and its numerous objects, features, and advantages made apparent to those skilled in the art by referencing the accompanying drawings.

FIG. 2A represents a screen that is operative when the research analyst is prompted to enter a numeric value for an attribute value.

FIG. 2B represents a screen that is operative when a research analyst is prompted to enter only one value from a finite number of discrete permissible values;

FIG. 3 is a representation of a typical screen display presented in a reconciliation process invoked in accordance with the invention. The use of the same reference symbols in different drawings indicates similar or identical items.

DESCRIPTION OF THE PREFERRED EMBODIMENT(S)

For a thorough understanding of the subject invention, reference is made to the following Description, which incorporates the above-described Drawings and the appended Claims.

Figure 1:
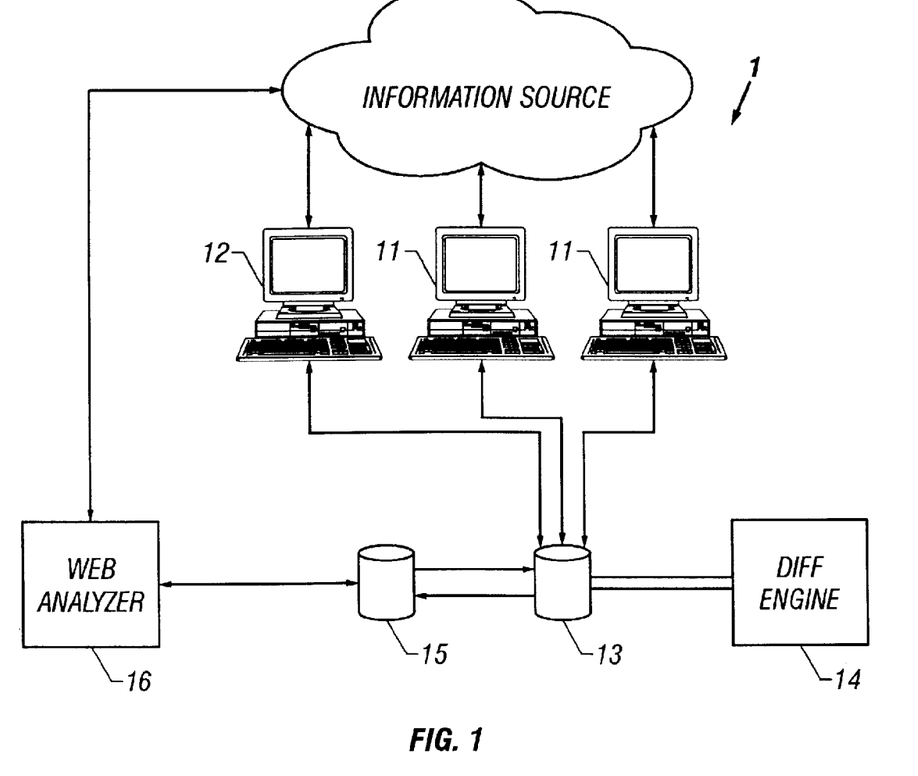
FIG. 1 is a system diagram of a preferred embodiment of a data compilation system in accordance with the subject invention.

Referring now to FIG. 1, the subject invention may be seen to include a data compilation system (or data compiler) 1 that includes desktop computers 11 operated by respective research analysts A and B. In a specific implementation of the invention, only two research analysts are required; however, the invention contemplates the use of two or more research analysts, inasmuch as the accuracy of the data collected can expected to improve with the number of research analysts that operate to collect that data.

As indicated above, significant application of the data compilation system is the collection of data that characterizes electronic equipment, such as personal computer systems, and for pedagogical purpose, the invention will be described in that context.

In a manner that will be more fully described below, each of the analysts is presented, on a screen display associated with desktop computer 11, with a predefined array of attributes that characterizes the equipment at hand. (Notwithstanding the above, in some instances the nature of the attributes requires that the RAs be enabled to define limited aspects of the attributes. The subject invention provides this enhancement in a manner described below.) As a simple example, nearly every type of electronic component or assembly will be characterized by its physical dimensions. Accordingly, one of the attributes of that component will be presented as, for example, "Dimensions," and the constituent subattributes of the attribute Dimension might be Height, Width, Depth, and Weight.

The analysts then independently search a global source of information related to the component in order to collect data that comprises values for the attributes or subattributes. A convenient source of relevant data is the worldwide web (WWW), which will likely contain websites comprising manufacturers data sheets in electronic form. Other sources may include, but are not limited to, paper catalogues, CDROMs, and so forth. Accordingly desktops 11 are installed with web browsers and are connected, as shown in FIG. 1, to the internet.

Each of the analysts independently searches the WWW to collect data representing the values of all the subattributes that constitute an attribute. When an attribute value, or subattribute value, is found, the respective analyst enters that value in the appropriate field of a record that completely characterizes the component. The record will comprise the array of attributes that characterizes the component and, when completed by the analyst, will contain values for all the subattributes that constitute the attribute, the records are stored in a database 13, as depicted in FIG. 1. In accordance with the invention, the essence of the task performed by the analysts is to access from database 13 records that define attributes that completely characterize a component. The analysts then search the WWW for the data necessary to provide values for all attributes in the array, or for all the subattributes if the attribute consists of a number of subattributes.

In the context in which the present invention is now described, the records themselves are identified as "SKU"s, wherein an SKU for a particular electronic component will consist of a manufacture's identification, such as "IBM," followed by an alphanumeric string, so that the SKU "IBM 26441AU" identifies a particular product, specifically a think pad, manufactured by IBM. The record in database 13 that characterizes that component will similarly be identified by that SKU.

Once a research analyst has completely entered values for all the attributes and subattributes, if any, required to specify an SKU, the SKU is deemed to be in a "Ready for Diff" state (SKU states will be more fully explicated below.), and the SKU record will contain a field that announces the RFD state. When both research analysts (or when all research analysts, when more than two are used) have completed data entry for a particular SKU, this condition is detected by a Diff Engine 14.

This occurs because Diff Engine 14 continually monitors the states of SKUs in database 13 and extracts and, in the manner described below, compares the values entered in the SKUs. The essence of the operation of Diff Engine 14 is to compare the values collected and entered independently by the respective research analysts. Operation of the Diff Engine is fully explicated immediately below. Understanding of Diff Engine operation is facilitated by comprehension of the significance of the various SKU states. Accordingly, the SKU states are defined:

SKU States

The following SKU states may be encountered and attributed to SKUs in working database:

"Available" (AV): the SKU is available for entry of values by an RA.

"Ready For Process" (RFP): an RA has captured the SKU and has begun, but not completed, entry of attribute values.

"Ready for Diff" (RFD): all RAs have completed entry of all attribute values for the SKU.

"Passed Diff" (PD): the Diff Engine has determined that all corresponding values in respective matched sets of SKUs, that have been completed by the RAs are equivalent.

"Ready For QA" (RFQA): the Diff Engine has determined that not all corresponding values in respective matched sets of SKUs completed by the RAs are equivalent, necessarily implying that reconciliation by a QA rep is required.

"Reconciled" (R): initially discrepant SKUs have been reconciled by a QA rep.

Difference Engine Algorithm

The Diff Engine operates to automatically locate, compare, and administrate multiple copies of data sets. In the context of the subject invention, the data sets are the SKUs. After comparison, there are two potential outcomes: The copies compared are "acceptably identical", in which case the SKU is assigned the state Passed Diff and will ultimately be made available for consumption by the client or consumer. Alternatively, the SKUs will be found not "acceptably identical", in which case the SKUs assigned the state "Ready for QA" and are referred to a QA representative for reconciliation.

For some definitions:
A group of data sets are "strictly identical" if:
a) Each SKU contains exactly the same attributes, for example, each has a single "color" attribute, and
b) Each attribute of each data set contains the same value as the corresponding attribute in every other corresponding SKU.

The concept of "acceptably identical" data sets derives from the fact that there can be an arbitrary number of SKUs to compare, depending on the number of RAs used to collect data for the SKU. With respect to double entry, it is relatively easy to detect when the attribute values of paired SKUs match. However, triple, quadruple, or ten-fold data entry might be employed, depending on the level of accuracy desired. And, as is easily understood, the complexity of SKU comparison increases, perhaps geometrically, with the number of SKUs that must be compared. At this point terms will be introduced, that will be central to an understanding of Diff Engine operation:
1) Attribute Threshold ($T_a$)
2) Attribute Uncertainty Interval (AUI)
3) Value Threshold ($T_v$)
4) Minimum Threshold ($T_m$)

Assume, for instance, that an SKU entry team is using ten-fold data entry; that is, every subattribute value is entered ten different times, independently by ten RAs, and that all ten values are compared against each other. Let us further assume that all RAs agree that "color" is a valid attribute. In this case, the question is how many of the ten RAs must agree on the color for that value to be considered to have "Passed Diff". In the extreme case, one might assume ten. That is, if nine RAs select "blue" and one RA selects "red", the value is deemed to have failed processing by the Diff Engine, is assigned "Ready for QA" status, and therefore must be resolved by QA. In this case, $T_v$ might be said to be 100%. That is, if there is not 100% agreement among the RAs, the value is declared suspect. Obviously, $T_v$ may be set less than 100%. For example, a $T_v$ of 80% would require only eight of ten RAs to agree on a value. $T_v$'s relative setting would drive the frequency with which data entries had to be manually reviewed by a QA team.

$T_a$ addresses with the same issue, but from the perspective of the validity of the attribute itself. Let us assume that $T_a$ is 80%. That is, if eight of ten RAs believe an attribute belongs in the SKU, then it is included in the "canon" of valid attributes. Conversely, if only two of the RAs believe that the attribute belongs, then the attribute is not included in the canon of accepted attributes. However, if seven RAs agree that the attribute belongs, and three do not, then a judgment must be made. Specifically, seven is less than 80% of ten, so the attribute should not be included in the array. However, from another perspective, only 30% agreed that the attribute should not be included. Even thought the RAs voting inclusion outnumbered the RAs voting not to include, the attribute is not included in the SKU. For this reason, there exists an "Existence Uncertainty Interval" in the selection of an attribute for inclusion in an SKU. If more than 100%−$T_a$ %, but fewer than $T_a$ %, RAs believe an attribute should be included, then the validity of the attribute itself is in dispute. This situation is resolved by the QA rep in the same way that attribute values are resolved.

As an example, assume a $T_a$ of 80% and a $T_v$ of 70%. In this case, the AUI is 20–80%. If no more than 20% of the RAs claim the attribute is relevant, then the attribute is not included (since at least 80% believe it is irrelevant). If at least 80% claim it is relevant, then it is included. If more than 20%, but fewer than 80%, claim it is relevant, then it is in dispute, or "uncertain". In this example, seven of the RAs claim "color" is relevant. It falls into the uncertainty interval, and the attribute is flagged for QA reconciliation. QA decides it is relevant, and the Diff Engine then compares the values. Two of the nine RAs select the color "blue" and seven, select "red". 70% of seven is 4.9, so at least five RAs are required to agree on the value for it to be automatically accepted. In this case, once QA has determined that "color" is an appropriate attribute, the Diff Engine would consider the agreement of the five RAs adequate to substantiate that the color is "blue".

However, if $T_a$ and $T_v$ are inappropriately chosen, it is possible to generate undesirable results. First, none should ever be 50% or lower. If $T_a$ is 50% or less, than there is no AUI, because 100%−$T_a$ % is in fact greater than $T_a$ %. If $T_v$ is 50% or less, it is possible that two different values both have enough "votes" to be considered correct. For instance, if $T_v$ is 50%, and half the RAs select "blue", and the other half select "red". The Diff Engine would be constrained to consider both correct under the rules stated above.

However, more subtle examples are possible. For instance, with a relatively high $T_a$ (say 80%), and relatively low $T_v$ (e.g. 60%), it could happen that three RAs select "color" as a valid attribute, but disagree on the "value" of the color, with two selecting "blue" and one selecting "red". Since three falls into the Uncertainty Interval, then QA would be required to resolve the very existence of the attribute. Assuming they agree it is relevant, then the Diff Engine would automatically assume that the color is "blue", since 67% of the RAs that claimed the attribute "color" was relevant selected the value as "blue". In this case, only two of ten RAs teams picked "color"/"blue" as an attribute/value pair. Nevertheless, the value was selected automatically, once "color" was verified as relevant. For this reason, the definition of "acceptably identical" can be designed to include a $T_m$ (Minimum Threshold), the lowest percentage of all RAs required to agree on the validity of an attribute before allowing automatic acceptance. If $T_m$ is 0%, then it has no effect. If $T_m=T_v$, then there is no "lessening" of the standard for an attribute that fails to receive a 100% relevance vote. If $T_m>T_v$, then obviously $T_v$ becomes irrelevant. In either of the latter two cases, item (b) of the following definition is superseded by item (c).

A group of SKUs are "acceptably identical" if:
a) No attribute in any SKU falls into the Uncertainty Interval;
b) For each attribute in the "canon", the attribute value is agreed upon by at least $T_v$ % of the RAs that claimed the attribute was relevant.
c) For each attribute in the "canon", its value is agreed upon by at least $T_m$ % of all RAs.

There are several ways to effectively implement the process algorithm described above. Two such methods follow:

The first method requires that the Diff Engine run a database query either continuously or on a fixed schedule. This query returns groups of SKUs that refer to the same item. For instance, the Diff Engine may search for identical manufacturer/manufacturer SKU tuples, or may search for identical UPC codes, or some other unique product identifier. When the Diff Engine finds a sufficient number of items (e.g. two for double-entry, three for triple-entry, etc.), that exhibit the appropriate state, i.e. "Ready for Diff", the Diff Engine initially determines that there are no attributes that fall into the Uncertainty Interval. If there are, the SKUs are flagged for QA for reconciliation. If not, or when returned from QA, the Diff Engine checks to make sure that each attribute in the canon is agreed upon by at least $T_v$ % of the RAs that claimed the attribute was relevant, and at least $T_m$ % of the RAs in total. If so, a new copy of the entry is made in the production database, with the appropriate attributes and attribute values populated. If not, the Diff Engine flags the SKUs in question to QA for reconciliation. The QA representative reconciles those values, and the completed entry is made in the production database.

The second method involves a more "Object Oriented" approach. Upon receipt of an item to enter, N+1 objects are created, where N is the number of RAs employed to select values for an SKU. One object is assigned as the "parent" object, and the other N are assigned, one to each data entry RA. As each "child" is completed, it notifies the parent of its new status. When the parent object has received N notifications, it calls out to the Diff Engine to perform a comparison of its "children". The Diff Engine (and QA rep, as applicable) write information to the parent object. When it has been completely differenced and/or reconciled, the parent object is promoted itself into the production database.

A slight alteration on the above schemes has the QA rep doing reconciliation of Attributes and Attribute Values simultaneously. That is, the Diff Engine knows, at the time it determines that an attribute is uncertain, whether or not it will need reconciliation if it is included in the canon. If it will, the QA rep is then notified to not only reconcile the attribute, but reconcile the attribute value at the same time, thus preventing QA from having to revisit an attribute.

Accordingly, and in summary, when the SKU values entered by both RAs are equivalent, the Diff Engine causes the SKU state to be indicated as "Passed Diif". SKUs with PD status are then extracted and retained in production database 15. However, when Diff Engine 14 determines that the values of the SKUs are not equivalent, the Diff Engine causes the SKU state to read "Reconcile". SKUs with a Reconcile state are identified by a Quality Assurance representative and processed as follows.

In essence, it is the task of QA, operating from desktop computer 12, to continually search database 13 for SKUs that are in the Reconcile state. Software included as part of the subject invention causes the discrepant SKUs to be simultaneously displayed on the monitor or desktop computer 12. Discrepancies in values entered by the RAs are highlighted, and if the QA rep so desires, the display can be collapsed so that only discrepant SKU values are presented to the QA rep. After identifying the discrepant SKU values, the QA rep has the option of selecting the values collected by either RA, or imposing a value of his own selection. This is accomplished, in the former situation by clicking on the values selected, and in the latter by manually entering a value at the keyboard of desktop 12. A representation of a screen display presented to the QA rep in the course of a reconciliation process is depicted in FIG. 3.

In the present embodiment of the invention, the significant features of the QA screen, as evident from FIG. 3, is that the screen is partitioned into (at least) three vertical partitions. The leftmost two partitions display attribute, or subattribute, descriptor and the values selected by the respective RAs. If the screen is not collapsed by the QA rep to display only discrepant attributes or subattributes, then the discrepant attributes are highlighted. The third, rightmost, partition (or column) displays the reconciled values imposed by the QA rep.

To this point, there has been described the salient features of data compilation system that effects dramatic improvements in the accuracy of the data that is collected and compiled in order to characterize electronic equipment, or components of electronic equipment. The improved accuracy results from establishing a predefined array of attributes, and subattributes, to characterize an equipment or a component of a system. RAs then search a global source of information regarding the equipment or component to acquire values for the respectively independently attributes and subattributes. The values are then compiled to create records (SKUs) retained in a database. The values indicated in the SKUs are then compared in a Diff Engine, If the attribute values are equal, the SKU is indicated as having Passed Diff and is thereby caused to be retained in a production database. If the Diff Engine indicates a lack of equivalence between paired SKUs, a reconciliation process is invoked which ultimately results in a reconciled SKU being retained in the production database.

Although the subject invention, insofar as described above,.has proved to promote a significant enhancement in the accuracy with which personal computer equipment, peripherals or components may be specified, further enhancements have been realized in specifically tailoring the manner in which data collection and entry is accomplished by the RAs. Arguably, this is the critical step in the data compilation system. Specifically, the data compilation system permits the RAs to enter value data in only one of a limited number of available modes, depending on the nature of the attributes and the universe of permissible values that may be correctly assigned to the attribute. In the present instantiation of the invention, the RAs are able to enter attribute values in one of four modes, depending on the nature of the attribute or subattribute. The four modes are: (1) entry of a numeric value; (2) selection of one value from a number of values presented to the RA; (3) selection of more than one value from a set of permissible values, or (4) entry of text. FIG. 2 illustrates examples of the screen displays that are presented to the RAs during the course of operation in each of the aforementioned modes of data entry. The illustrated screens arise during the course of data entry, which data as will soon be seen, may be numerical or textual, that characterizes a think pad distributed by IBM. The think pad has been assigned the SKU "IBM26441AU".

Referring now to FIG. 2A, the RA elected to enter values for the subattribute "Installed Video Memory (MB)", which is a subattribute of the attribute "Display" (not shown in FIG. 2A). As shown in the right partition of the display, the RA had been provided a prompt 211 to "Enter Numeric Value". In response, the RA is shown to have entered the numeric value "2.5". The value entered was found not to conform to the set of discrete permissible values, or within the range of permissible values, and consequently an error message, "Not a valid value" appears. This aspect of the invention may be perceived as an error check, inasmuch as the error message prompted by the attempt to enter an impermissible value will incent the RA to reconsider, and correct, the value entered.

In FIG. 2B, it can be seen that the RA is entering a value for the "Display" subattribute "Native Display Resolution". In this instance, the RA is presented in window 221 with a plurality of permissible values, from which he is able to choose one. With respect to the IBM 26441AU, the system recognizes "1024X768(XGA)" as a correct selection.

Figure 2C:
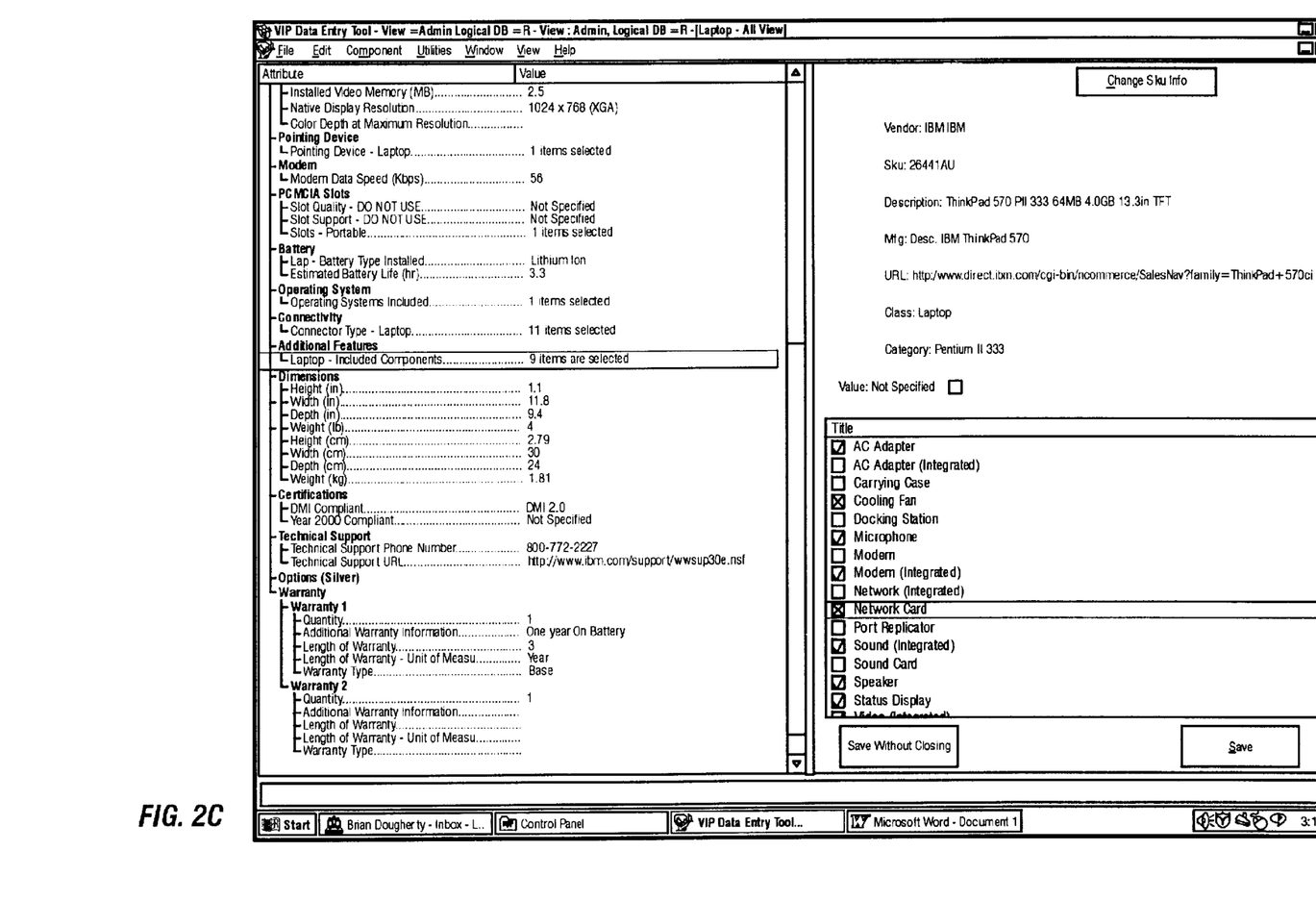
FIG. 2C represents a screen that is operative when a research analyst is prompted to enter one or more values, either numeric or literal, from a finite number of permissible values.

In FIG. 2C, the RA is provided in window 231 with a menu of "Additional Features" from which to select, and the RA is free to select the values (which in this case are not numeric) that his research has indicated as available with the IBM 26441AU.

Figure 2D:
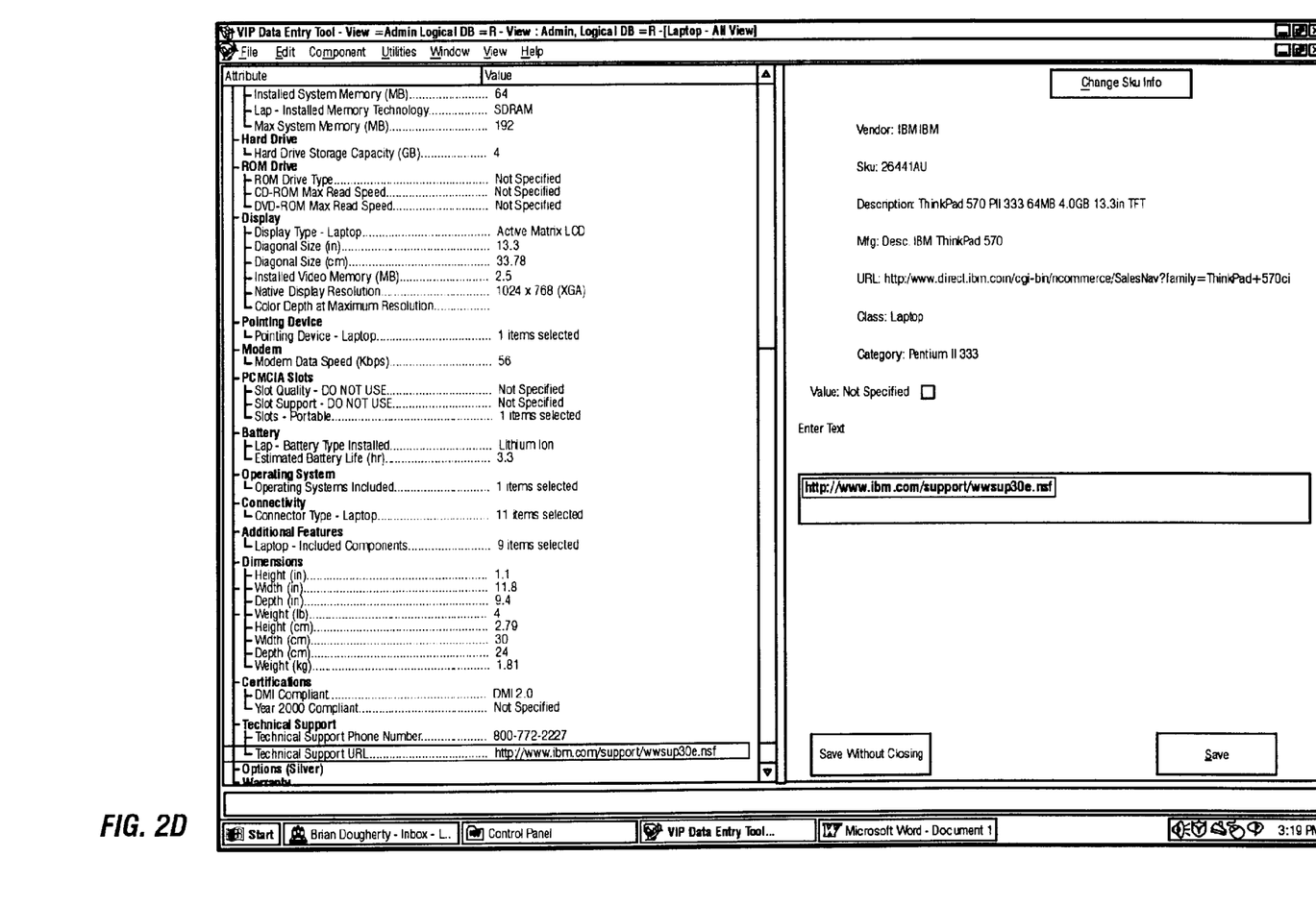
FIG. 2D represents a screen that is operative when the research analyst is prompted to enter a value that is textual in nature.

Behind the screen displayed in FIG. 2D, the RA is characterizing the attribute "Technical Support" and, in particular, the subattribute "Technical Support URL". Here the RA has been provided a prompt 241 to enter a value in the form of (text, that is, the Internet address "http://www.ibm.com/support/wwwsup30e.msf" at which web based technical support me be obtained.

A further elaboration of the invention allows the RA to define additional attributes at the time of data collection For example, if it is assumed that the RA is in the process of characterizing a system for a desktop computer, then one of the defining attributes of that system board is its "Expansion Slots". However, system boards may have an unpredictable number of expansion slots, and, moreover, it is impracticable to even predict the maximum number of expansion slots. This difficulty is resolved by enabling the RA to, at the time of acquisition of data specifying the system board, determine the number of expansion slots available. So that under the attribute "Expansion Slot", the RA can create Expansion Slot 1, Expansion Slot 2, . . . , Expansion Slot N. Each of the N expansion slots will be characterized by its own subattributes such as "Length", "Number of Connections", "Bus Standard Supported", "Data Type", etc.

Figure 2E:
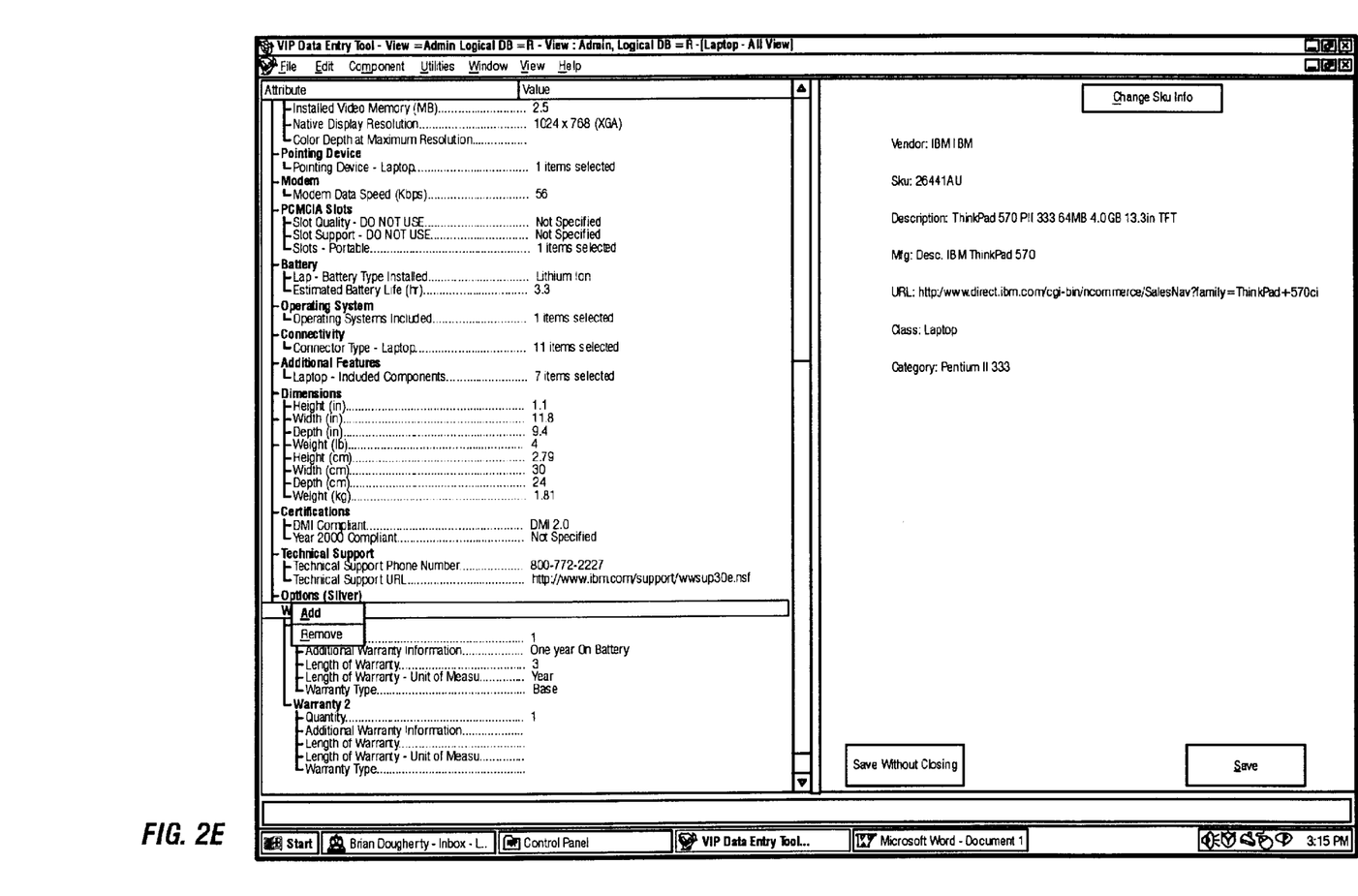
FIG. 2E represents a screen that is operative when a research analyst is enable to add a number of subattributes determined by the analyst at the time of data collection.

An example of this capability is presented in FIG. 2E, which depicts an example of a screen that enables the RA to define a number of "Warranty" attributes applicable to the IBM 26441AU Think Pad. As seen from FIG. 2E, the RA has completed the specification of "Warranty 1", which is seen to be a 3-year base warranty, and is in the process of specifying "Warranty 2". Upon completion of the specification of Warranty 2, the RA is able to exercise the option of entering additional warranty attributes simply by clicking on the "Add" bar highlighted on FIG. 2E.

By virtue of the above, the narrative, an appreciation of the long sought advantages realized by the subject invention is deemed to have been conveyed. As an embellishment, however, that assures the freshness of the data retained in database 15, as preferred embodiment of the invention also includes a web analyzer 16 that is coupled to database 15, as well as to the WWW.

Web analyzer 16 operates to periodically scan the WWW for the then-current data regarding the SKUs stored in database 15. If the current data available has been updated, changed refreshed since the creation of the respective SKU record in database 15, then the status of the record is indicated to be "Update", which will indicate that the SKU requires updating in accordance with the methods described above.

Although the subject invention has been described above with reference to a particular, preferred, embodiment, it is to be understood that various additions, deletions and modifications to the embodiment described may be implemented by those with ordinary skill in the art, and such additions, deletions, and modifications will not depart from the scope of the invention, as defined by the appended claims. In particular, it may be reasonably anticipated that the processor partitioning, specifically, the allocation of separate processors to the RAs, QA representative and Diff Engine may, depending on processor bandwidth, be combined in whole or in part. Moreover, it may be, or may become, practicable to automate the RA and QA functions with software applications. Furthermore, the segregation of the working database and production database is not considered a limitation of the invention.

What is claimed is:

1. A method of compiling data to specify an object, the method comprising the steps:

(a) establishing a predefined array of attributes to characterize the object;

(b) independently, by virtue of at least a first agent and a second agent, acquiring at least a first attribute value and a second attribute value for each of the attributes;

(c) comparing the first and the second attribute values acquired in step (b);

(d) if the attribute values, when compared in step (c), are determined to be equal, writing the attribute value into an attribute database; and (e) if the attribute values, when compared in step (c), are determined to be not equal, invoking a reconciliation process that causes an attribute value to be written into the attribute database.

2. A method as defined in claim 1 wherein step (b) includes the following substeps, which substeps are performed independently by each of the agents:

(b)(i) searching a global source of attribute values, the global source including the worldwide web, electronic data sheets, paper catalogues, and CDROMs;

(b)(ii) inspecting a predetermined list of permissible attribute values; and (b)(iii) selecting an attribute value from the predetermined list, the selection undertaken with reference to attribute values obtained in substep (b)(i).

3. A method as defined in claim 2 wherein, subsequent to step (b), the global source of attribute values is analyzed to determine whether attribute values have been updated.

4. A method as defined in claim 1 wherein step (b) comprises the substeps:

(b)(i) each of the agents' searching a global source of attribute values, the global source including the worldwide web, electronic data sheets, paper catalogues, and CDROMs;

(b)(ii) each of the agents' inspecting a predetermined list of permissible attribute values; and (b)(iii) each of the agents' selecting an attribute value from the predetermined list, the selection undertaken with reference to attribute values obtained in substep (b)(i).

5. A method as defined in claim 1 above wherein step (b) includes the following substeps, which substeps are performed independently by each of the agents:

(b)(i) searching a global source of attribute values, the global source including the worldwide web, electronic data sheets, paper catalogues, and CDROMs;

(b)(ii) entering an attribute value in one of a limited number of predetermined modes, wherein the limited number of predetermined modes includes the nature of the attribute as well predetermined limits, if any, imposed on the values of the attributes.

6. A method as defined in claim 5 wherein the number of modes includes the mode of entering a numerical value.

7. A method as defined in claim 6 wherein the numerical value is error checked by comparing the entered value with a permissible set of values or with a permissible range of values.

8. A method as defined in claim 6 wherein the number of modes includes the mode of selecting only one value from a predetermined set of values.

9. A method as defined in claim 6 wherein the number of modes includes the mode of selecting one or more values from a predetermined set of values.

10. A method as defined in claim 6 wherein the number of modes includes the mode of entering a value in textual form.

11. A system for compiling data characterizing an object, the system comprising:

acquisition means for acquiring values of attributes that characterize the object;

difference means for determining the equivalence, vel non, of at least two independently acquired values of the same attribute;

a database coupled to the difference means, the database for storing values of the attributes, which values have been error checked; and means coupled to the database for extracting values of attributes and for compiling the values so as to characterize the object.

12. A system as defined in claim 11 wherein the acquisition means comprises a first acquisition agent for acquiring a first value of an attribute and comprises a second acquisition agent for acquiring a second value of the attribute, wherein the first and second values may or may not be equivalent.

13. A system as defined in claim 12 wherein the first agent has an output coupled to an input of the difference means and the second agent has an output coupled to an input of the difference means and wherein the first and the second agents have inputs, each respectively coupled to a source of values of attributes.

14. A system as defined in claim 13 wherein the difference means has an output coupled to the database and wherein the difference means is operable to write a value of an attribute to the database when the value has been determined to have been acquired equivalently by both the first and the second agents.

15. A system as defined in claim 14 further comprising analyzer means for examining the source of values of the attributes to determine whether the values have been updated.

16. A system as defined in claim 13 wherein the first agent has an output coupled to an input of the database and the second agent has an output coupled to an input of the database.

17. A system as defined in claim 16 wherein the difference means has an input coupled to an output of the database and has an output coupled to an input of the database and wherein the difference means is operable to write a value of an attribute to the database when the value has been determined to have been acquired equivalently by both the first and the second agents.

18. A system as defined in claim 17 further comprising analyzer means for examining the source of values of the attributes to determine whether-the values have been updated.

19. A method of compiling data to specify an object, the method comprising the steps:

(a)(i) accessing, via a first agent, a global source of information that contains values of attributes that characterize the object, the global source including the worldwide web, electronic data sheets, paper catalogues, and CDROMs;

(a)(ii) comparing a value of an attribute accessed by the first agent to a predetermined list of values, which list contains an accurate value of the attribute;

(a)(iii) selecting a value of the attribute that is acceptably equivalent to a predetermined accurate value;

(a)(iv) writing the value selected in step (a)(iii) into a database;

(b)(i) accessing, via a second agent, a global source of information that contains values of attributes that characterize the object, the global source including the worldwide web, electronic data sheets, paper catalogues, and CDROMs;

(b)(ii) comparing a value of an attribute accessed by the second agent to a predetermined list of values, which list contains an accurate value of the attribute;

(b)(iii) selecting a value of the attribute that is acceptably equivalent to a predetermined accurate value;

(b)(iv) writing the value selected in step (b)(iii) into a database;

(c) causing a difference engine to retrieve from the database values of the attribute written into the database in the course of performance of step (a) and step (b) above, comparing the values retrieved, and, if the values retrieved are equal, retaining the equal value in the database.

20. A method as defined in claim 19, wherein steps (a), (b) and (c) are performed in connection with an array of attributes that have been established to characterize the object.

21. A method as defined in claim 20 comprising the further step of extracting from the database values for the array of attributes so as to form a compilation of values that specify the object.

22. A method as defined in claim 21 wherein, subsequent to step (c), the global source of information is analyzed to determine whether values of attributes have been updated.

23. A method as defined in claim 19 wherein, if the values compared in step (c) are not equal, invoking a resolution process that results in the writing of a value of the attribute into the database.

24. A method as defined in claim 23, wherein steps (a), (b) and (c) are performed in connection with an array of attributes that have been established to characterize the object.

25. A method as defined in claim 24 comprising the further step of extracting from the database values for the array of attributes so as to form a compilation of values that specify the object.

26. A method as defined in claim 25 wherein, subsequent to step (c), the global source of information is analyzed to determine whether values of attributes have been updated.

27. In a system that utilizes a plurality of acquisition agents for respectively and independently acquiring values of an attribute for characterizing an object, wherein each of the agents acquires a value by searching a source of information regarding the object and, as a result of the search, selects value of the attribute, a data compiler comprising:

a database having one or more inputs for coupling to the agents to accept values selected by the agents; and a difference engine coupled to-the database for:
(i) reading two or more values of the attributes that have been selected by agents and are stored in the database,
(ii) comparing the two or more values, and
(iii) if the values that are compared are equivalent, causing a value to be retained by the database, and
(iv) if the values that are compared are not equivalent, causing a reconciliation process to be invoked.

28. A data compiler as defined in claim 27, wherein the database is a relational database that stores records corresponding to the objects and the records consist primarily of values of attributes that characterize the objects.

29. A data compiler as defined in claim 27 wherein the database includes information regarding the status of records stored in the database.

30. A data compiler as defined in claim 27 further comprising an analyzer for examining the source of information to determine whether values of attributes have been updated subsequent to a most recent search by an agent.

31. A data compiler as defined in claim 30 wherein the database information regarding the status of records stored in the database.

32. A data collection and compilation system for creating, storing, and distributing a record that characterizes an object, the record containing values of a predetermined array of attributes that characterize the object, the system comprising:

a first database for storing the record;

a processor coupling a first research analyst to a global source of information containing candidate values of the attributes and coupling the first research analyst to the database for entering into the record values selected by the first research analyst, the global source including the worldwide web, electronic data sheets, paper catalogues, and CDROMs;

a processor coupling a second research analyst to a global source of information containing candidate values of the attributes and coupling the second research analyst to the database for entering into the record values selected by the second research analyst, the global source including the worldwide web, electronic data sheets, paper catalogues, and CDROMs;

a difference engine coupled to the first database for (i) reading and comparing the respective values entered by the first and the second research analysts, (ii) for comparing those values, and (iii) for causing to be inserted into the record status information that indicates whether the values compared are equivalent or not equivalent; and a processor for coupling a reconciliation agent to the first database for enabling the reconciliation agent to read a record that contains status information that indicates that values compared by the difference engine were not equivalent and for enabling the reconciliation agent to enter a reconciled value for the attribute.

33. A data collection and compilation system as defined in claim 32 further comprising a second database for extracting from the first database a record that contains values of an attribute that (a) were equivalent when entered by the first research analyst and the second research analyst or (b) have been reconciled by the reconciliation agent.

34. In a system that utilizes a plurality of acquisition agents for respectively and independently acquiring values of an attribute for characterizing an object, wherein each of the agents acquires a value by searching a source of information regarding the object and, as a result of the search, selects and enters into a database a value of the attribute:

a difference engine coupled to the database for:
(i) reading two or more values of the attributes that have been selected by agents and are stored in the database,
(ii) comparing the two or more values,
(iii) if the values that are compared are determined by the difference engine to be equivalent, causing a value to be retained by the database, and
(iv) if the values that are compared are determined by the difference engine not to be equivalent, causing a reconciliation process to be invoked.

35. A difference engine as defined in claim 34, wherein the difference engine determines values of attributes to be equivalent if:

(a) the attribute does not fall within an Uncertainty Interval;

(b) the attribute value is selected by a first predetermined percentage of acquisition agents who had a priori deemed the respective attribute to be relevant in characterizing the object; and (c) the attribute value is agreed upon by at least a second predetermined percentage of all the acquisition agents.

36. A method of compiling data to specify an object, the method comprising the steps:

(a) establishing a predetermined array of attributes to characterize the object, which array includes at least one attribute that is constituted from an undefined number of subattributes of the same type;

(b)(i) by virtue of a first acquisition agent, determining the undefined number of subattributes and acquiring a first set of values for the number of subattributes determined by the first acquisition agent; and (b)(ii) by virtue of a second acquisition agent, and substantially independent of the first acquisition agent, determining the undefined number of subattributes and acquiring a second set of values for the undefined number of subattributes determined by the second acquisition agent, wherein the undefined number of subattributes is respectively, and independently, determined by the first and by the second acquisition agents in the course of acquisition of the values.

37. A method as defined in claim 36, comprising the further steps:

(c) comparing the first and the second attribute values acquired in step (b)(i) and step (b)(ii);

(d) if the attribute values, when compared in step (c), are determined to be equal, writing the attribute values into an attribute database; and (e) if the attribute values, when compared in step (c), are determined to be not equal, invoking a reconciliation process that causes attribute values to be written into the attribute database.

* * * * *